United States Patent
Cho et al.

(10) Patent No.: US 11,031,624 B2
(45) Date of Patent: Jun. 8, 2021

(54) POLYSILSESQUIOXANE POLYALKYLENE GLYCOL POLYMER HAVING URETHANE BONDS, SOLID POLYMER ELECTROLYTE COMPOSITION COMPRISING THE SAME AND METHOD OF PREPARING THE SAME

(71) Applicant: KOREA INSTITUTE OF INDUSTRIAL TECHNOLOGY, Cheonan-si (KR)

(72) Inventors: Bong Sang Cho, Seoul (KR); Ki Young Kim, Yongin-si (KR); Jun Choi, Seoul (KR); Do Hyung Park, Anyang-si (KR); Jae Chui Lee, Suwon-si (KR); Ji San Jeong, Asan-si (KR); Kyung Min Kim, Seoul (KR); Sin Seok Oh, Cheongju-si (KR); Seong Kwan Kim, Cheongju-si (KR); Yong Pyo Lee, Cheongju-si (KR)

(73) Assignee: Korea Institute of Industrial Technology, Cheonan-si (KR)

( * ) Notice: Subject to any disclaimer, the term of this patent is extended or adjusted under 35 U.S.C. 154(b) by 320 days.

(21) Appl. No.: 16/186,625

(22) Filed: Nov. 12, 2018

(65) Prior Publication Data
US 2019/0157716 A1 May 23, 2019

(30) Foreign Application Priority Data
Nov. 21, 2017 (KR) .......................... 10-2017-0155910

(51) Int. Cl.
*H01M 10/0565* (2010.01)
*C08G 77/54* (2006.01)
(Continued)

(52) U.S. Cl.
CPC ...... *H01M 10/0565* (2013.01); *C08G 65/336* (2013.01); *C08G 77/54* (2013.01); *H01M 10/0525* (2013.01); *H01M 2300/0085* (2013.01)

(58) Field of Classification Search
None
See application file for complete search history.

(56) References Cited

U.S. PATENT DOCUMENTS

| 6,172,152 B1 | 1/2001 | Kim et al. |
| 2005/0020715 A1* | 1/2005 | Hasegawa ........... H01M 8/1072 522/134 |
| 2015/0249269 A1 | 9/2015 | Yoon et al. |

FOREIGN PATENT DOCUMENTS

| KR | 10-1999-015926 A | 3/1999 |
| KR | 10-2014-0066645 A | 6/2014 |

(Continued)

OTHER PUBLICATIONS

Honma "Organic-inorganic hybrid is fuel-cell electrolyte membrane". Yuki, Muki Nano Fukugo no Shinkyokumen (2004), pp. 31-38.*

(Continued)

*Primary Examiner* — Laura Weiner
(74) *Attorney, Agent, or Firm* — Rabin & Berdo, P.C.

(57) ABSTRACT

Disclosed is a polyalkylene glycol (PAG) polymer having urethane bonds, represented by Structural Formula 1 below.

[Structural Formula 1]

(Continued)

The present invention further relates to a solid polymer electrolyte composition, composed of a polyalkylene glycol polymer having urethane bonds, and a lithium salt. The solid polymer electrolyte of the invention can exhibit superior compatibility, stability, flexibility, mechanical properties and ionic conductivity.

2 Claims, 4 Drawing Sheets

(51) Int. Cl.
  *H01M 10/0525* (2010.01)
  *C08G 65/336* (2006.01)

(56) References Cited

FOREIGN PATENT DOCUMENTS

KR    10-2015-0061538 A    6/2015
WO    WO 2015/076461 A1    5/2015

OTHER PUBLICATIONS

Hyunjoon Kim et al., "Gas Permeation Properties of Organic-Inorganic Hybrid Membranes Prepared from Hydromyl-Terminated Polyether and 3-isocyanatopropyltriethoxysilane", Journal of Sol-Gel Science and Technology, 2005, pp. 213-221, vol. 36.

\* cited by examiner

POLYSILSESQUIOXANE POLYALKYLENE GLYCOL POLYMER HAVING URETHANE BONDS, SOLID POLYMER ELECTROLYTE COMPOSITION COMPRISING THE SAME AND METHOD OF PREPARING THE SAME

BACKGROUND OF THE INVENTION

1. Technical Field

The present invention relates to a polysilsesquioxane polyalkylene glycol (PAG) polymer having urethane bonds, a solid polymer electrolyte comprising the same, a method of preparing the same and a lithium secondary battery comprising the polymer electrolyte. More particularly, the present invention relates to a polyalkylene glycol polymer matrix through the condensation reaction between a polyalkylene glycol (PAG) and an isocyanate-based silane compound, and a method of preparing the same.

2. Description of the Related Art

With the rapid development of electrical, electronic and computer industries, there is a growing need for secondary batteries having high performance and high stability. In particular, due to the trend toward miniaturization and portability of electrical and electronic products, secondary batteries, which are essentially used in such fields, are required to be thinned and miniaturized.

A lithium polymer secondary battery including a solid electrolyte does not have the drawbacks of an existing lithium ion battery using a liquid electrolyte. Specifically, a lithium polymer secondary battery may exhibit superior stability and low manufacturing cost, and may be used for the fabrication of a large-sized battery. Moreover, few limitations are imposed on the size or shape of the battery.

Conventionally, in order to increase the ionic conductivity of the polymer electrolyte, the addition of a plasticizer that lowers crystallinity has been devised, but is problematic because the compatibility of the plasticizer is low.

SUMMARY OF THE INVENTION

Accordingly, the present invention has been made keeping in mind the problems encountered in the related art, and the present invention is intended to provide a solid polymer electrolyte composition, comprising a matrix-type polyalkylene glycol (PAG) configured such that silsesquioxane is linked to a polyalkylene glycol (PAG) polymer chain having urethane bonds, and a lithium salt.

In addition, the present invention is intended to provide a solid polymer electrolyte composition, having superior compatibility, stability, flexibility, mechanical properties, and ionic conductivity, and a method of preparing the same.

An aspect of the present invention provides a polyalkylene glycol (PAG) polymer having urethane bonds, represented by Structural Formula 1 below.

[Structural Formula 1]

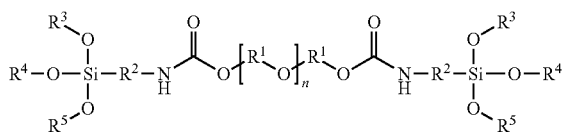

In Structural Formula 1, $R^1$ is independently a C1 to C20 alkylene group, $R^2$ is independently a C1 to C20 alkylene group, $R^3$ to $R^5$ are the same as or different from each other, and are each independently a C1 to C20 alkyl group, and n is any one integer of 1 to 150.

Preferably, $R^1$ is independently a C1 to C6 alkylene group, $R^2$ is independently a C1 to C6 alkylene group, and $R^3$ to $R^5$ are the same as or different from each other, and are each independently a C1 to C6 alkyl group.

Also, n may be any one integer of 6 to 50.

The polyalkylene glycol polymer may have a weight average molecular weight (Mw) of 300 to 200,000.

Another aspect of the present invention provides a solid polymer electrolyte, comprising: a matrix comprising polyalkylene glycol polymer gel prepared by subjecting a polyalkylene glycol (PAG) polymer having urethane bonds by Structural Formula 1 below to a sol-gel reaction; and a lithium salt dispersed in the matrix.

[Structural Formula 1]

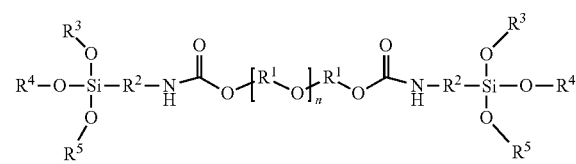

In Structural Formula 1, $R^1$ is independently a C1 to C20 alkylene group, $R^2$ is independently a C1 to C20 alkylene group, $R^3$ to $R^5$ are the same as or different from each other, and are each independently a C1 to C20 alkyl group, and n is any one integer of 1 to 150.

The lithium salt may include at least one selected from among lithium bis(trifluoromethane)sulfonimide salt, lithium perchlorate, lithium hexafluorophosphate, lithium tetrafluoroborate, and lithium trifluoromethanesulfonate.

Still another aspect of the present invention provides a lithium secondary battery comprising the solid polymer electrolyte.

Yet another aspect of the present invention provides a method of preparing a solid polymer electrolyte, comprising: (a) preparing a polyalkylene glycol polymer having urethane bonds represented by Structural Formula 1 below by subjecting a polyalkylene glycol represented by Structural Formula 2 below and an isocyanate-based silane represented by Structural Formula 3 below to a condensation reaction; (b) preparing a mixture by mixing the polyalkylene glycol polymer, and a lithium salt; and (c) preparing a solid polymer electrolyte by subjecting the polyalkylene glycol polymer of the mixture to a sol-gel-reaction.

[Structural Formula 2]

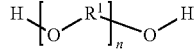

In Structural Formula 2, $R^1$ is a C1 to C20 alkylene group, and n is any one integer of 1 to 150.

[Structural Formula 3]

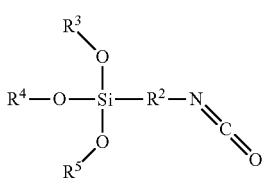

In Structural Formula 3, $R^2$ is a C1 to C20 alkylene group, and $R^3$ to $R^5$ are the same as or different from each other, and are each independently a C1 to C20 alkyl group.

[Structural Formula 1]

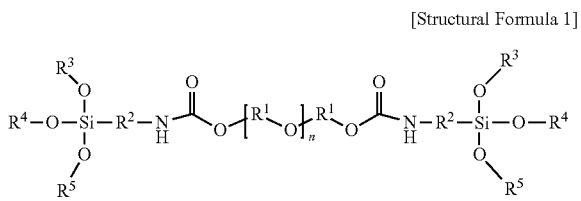

In Structural Formula 1, $R^1$ is independently a C1 to C20 alkylene group, $R^2$ is independently a C1 to C20 alkylene group, $R^3$ to $R^5$ are the same as or different from each other, and are each independently a C1 to C20 alkyl group, and n is any one integer of 1 to 150.

The polyalkylene glycol may include at least one selected from among polyethylene glycol, polypropylene glycol, and polytetramethylene glycol.

The isocyanate-based silane may include at least one selected from among 3-(triethoxysilyl)propyl isocyanate, 3-(trimethoxysilyl)ethyl isocyanate, 3-(trimethoxysilyl)propyl isocyanate, 3-(trimethoxysilyl)butyl isocyanate, and 3-(triethoxysilyl)butyl isocyanate.

In step (a), the polyalkylene glycol represented by Structural Formula 2 and the isocyanate-based silane represented by Structural Formula 3 are reacted at a molar ratio of 1:2 to 1:2.5.

In step (b), the mixture may include 20 to 90 wt % of the polyalkylene glycol polymer having urethane bonds and 10 to 80 wt % of the lithium salt.

In step (c), a matrix comprising polyalkylene glycol (PAG) polymer having urethane bonds may be formed through the sol-gel reaction.

Still yet another aspect of the present invention provides a method of manufacturing a lithium secondary battery including the method of preparing the solid polymer electrolyte as above.

According to the present invention, a solid polymer electrolyte composition comprises a matrix-type polyalkylene glycol (PAG) configured such that silsesquioxane is linked to a polyalkylene glycol (PAG) polymer chain having urethane bonds, and a lithium salt.

Also, according to the present invention, the solid polymer electrolyte can exhibit superior compatibility, stability, flexibility, mechanical properties, and ionic conductivity.

DESCRIPTION OF SPECIFIC EMBODIMENTS

Figure 1:
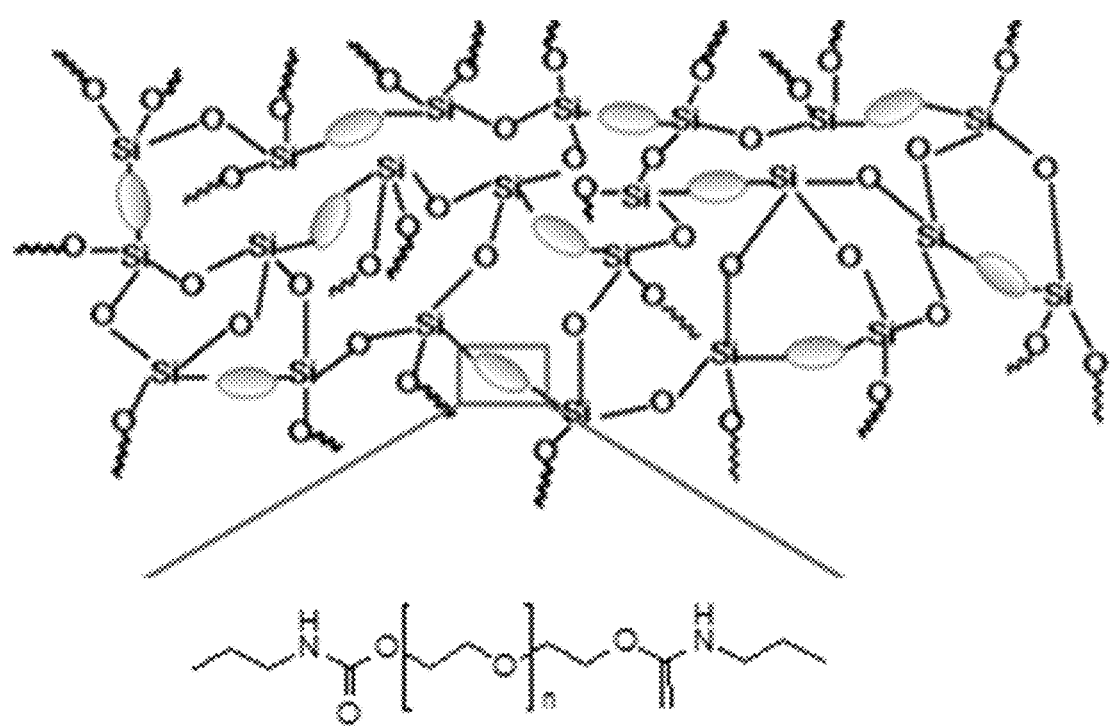
FIG. 1 schematically shows the structure of a sol-gel hybrid matrix for a solid polymer electrolyte prepared in Example 2 to 5.

The present invention may be embodied in many different forms, and should not be construed as being limited only to the embodiments set forth herein, but should be understood to cover all modifications, equivalents or alternatives falling within the ideas and technical scope of the present invention. In the description of the present invention, detailed descriptions of related known techniques incorporated herein will be omitted when the same may make the gist of the present invention unclear.

As used herein, the terms "first", "second", etc. may be used to describe various elements, but these elements are not to be limited by these terms. These terms are only used to distinguish one element from another. For example, a first element may be termed a second element, and similarly, a second element may be termed a first element, without departing from the scope of the present invention.

Further, it will be understood that when an element is referred to as being "formed" or "stacked" on another element, it can be formed or stacked so as to be directly attached to all surfaces or one surface of the other element, or intervening elements may be present therebetween.

Unless otherwise stated, the singular expression includes a plural expression. In this application, the terms "comprise", "include" or "have" are used to designate the presence of features, numbers, steps, operations, elements, parts, or combinations thereof described in the specification, and should be understood as not excluding the presence or additional possible presence of one or more different features, numbers, steps, operations, elements, parts, or combinations thereof.

Below is a description of a polyalkylene glycol (PAG) polymer having urethane bonds according to the present invention.

The present invention pertains to a polyalkylene glycol (PAG) polymer having urethane bonds, represented by Structural Formula 1 below.

[Structural Formula 1]

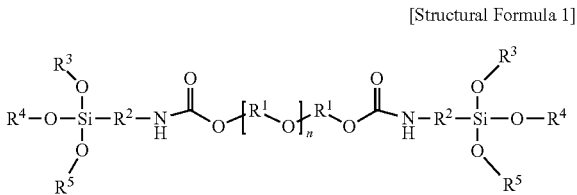

In Structural Formula 1, $R^1$ is independently a C1 to C20 alkylene group, $R^2$ is independently a C1 to C20 alkylene group, $R^3$ to $R^5$ are the same as or different from each other, and are each independently a C1 to C20 alkyl group, and n is any one integer of 1 to 150.

Preferably, $R^1$ is independently a C1 to C10 alkylene group, and more preferably a C1 to C8 alkylene group.

Preferably, $R^2$ is independently a C1 to C6 alkylene group, and more preferably a C2 to C6 alkylene group.

Preferably, $R^3$ to $R^5$ are the same as or different from each other, and are each independently a C1 to C6 alkyl group, and specific examples thereof may include, but are not limited to, a methyl group, an ethyl group, a propyl group, an isopropyl group, a butyl group, a pentyl group, and a hexyl group.

Here, n is any one integer of 1 to 150, and preferably any one integer 6 to 50.

The polyalkylene glycol polymer may have a weight average molecular weight (Mw) of 300 to 200,000, and preferably 1,000 to 10,000.

Polysilsesquioxane, functioning as a plasticizer for decreasing crystallinity, is linked to both ends of polyalkylene glycol through urethane bonding, thus preparing a bridge-type polymer of Structural Formula 1.

Below is a description of a solid polymer electrolyte according to the present invention.

The present invention pertains to a solid polymer electrolyte, comprising: a matrix comprising polyalkylene glycol polymer gel prepared by subjecting a polyalkylene glycol (PAG) polymer having urethane bonds by Structural Formula 1 below to a sol-gel reaction; and a lithium salt dispersed in the matrix.

[Structural Formula 1]

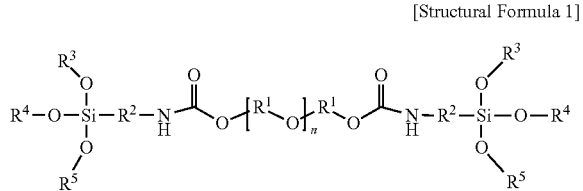

In Structural Formula 1, $R^1$ is independently a C1 to C20 alkylene group, $R^2$ is independently a C1 to C20 alkylene group, $R^3$ to $R^5$ are the same as or different from each other, and are each independently a C1 to C20 alkyl group, and n is any one integer of 1 to 150.

Examples of the lithium salt may include lithium bis(trifluoromethane)sulfonimide salt, lithium perchlorate, lithium hexafluorophosphate, lithium tetrafluoroborate, and lithium trifluoromethanesulfonate, and preferably lithium bis(trifluoromethane)sulfonimide salt is used.

In addition, the solid polymer electrolyte of the present invention may be used in a lithium secondary battery.

FIG. 1 schematically shows the structure of a matrix prepared by subjecting a polyalkylene glycol polymer to a sol-gel reaction.

The matrix has a form configured such that polysilsesquioxane is linked to both ends of polyalkylene glycol through urethane bonding, thus forming a bridge-type polymer.

Figure 2:
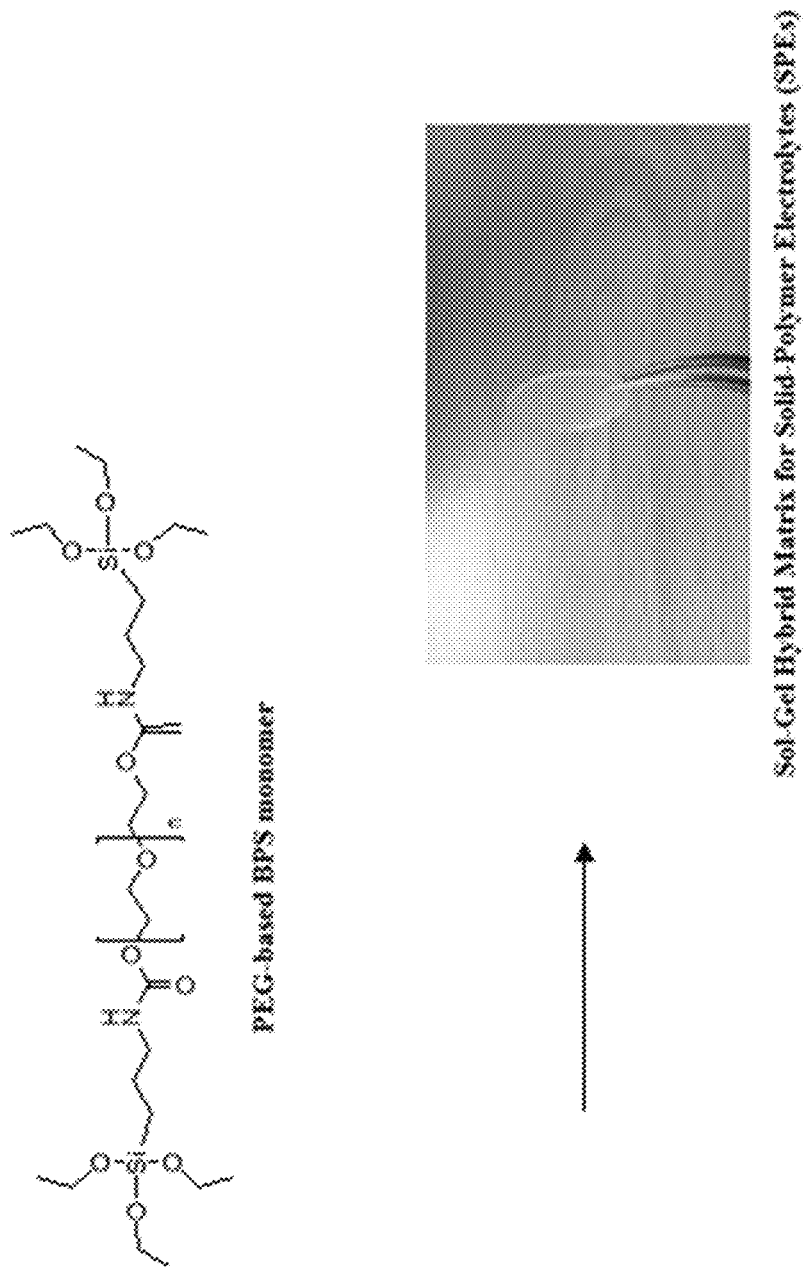
FIG. 2 shows a solid polymer electrolyte film prepared in Example 2 to 5.

FIG. 2 shows a solid polymer electrolyte film prepared by mixing a matrix obtained by sol-gel reaction of a polyalkylene glycol polymer prepared according to Example 1 with a lithium salt.

As shown in FIG. 1 and FIG. 2, below is a description of a method of preparing the solid polymer electrolyte according to present invention.

Specifically, a polyalkylene glycol represented by Structural Formula 2 below and an isocyanate-based silane represented by Structural Formula 3 are reacted, thus preparing a polyalkylene glycol (PAG) polymer having urethane bonds represented by Structural Formula 1 below (step a).

[Structural Formula 2]

In Structural Formula 2, $R^1$ is a C1 to C20 alkylene group, and n is any one integer 1 to 150.

[Structural Formula 3]

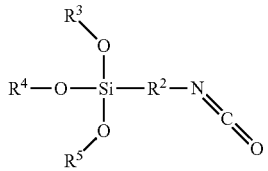

In Structural Formula 3, $R^2$ is a C1 to C20 alkylene group, and $R^3$ to $R^5$ are the same as or different from each other, and are each independently a C1 to C20 alkyl group.

[Structural Formula 1]

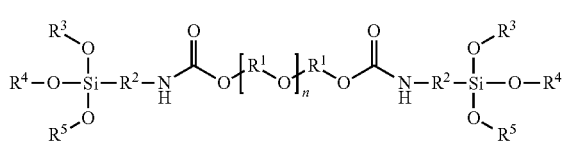

In Structural Formula 1, $R^1$ is independently a C1 to C20 alkylene group, $R^2$ is independently a C1 to C20 alkylene group, $R^3$ to $R^5$ are the same as or different from each other, and are each independently a C1 to C20 alkyl group, and n is any one integer of 1 to 150.

Examples of the polyalkylene glycol may include polyethylene glycol, polypropylene glycol, and polytetramethylene glycol, and preferably polyethylene glycol and polypropylene glycol are used, and more preferably polyethylene glycol is used.

The isocyanate-based silane may include 3-(triethoxysilyl)propyl isocyanate, 3-(trimethoxysilyl)ethyl isocyanate, 3-(trimethoxysilyl)propyl isocyanate, 3-(trimethoxysilyl)butyl isocyanate, and 3-(triethoxysilyl)butyl isocyanate, and preferably 3-(triethoxysilyl)propyl isocyanate is used.

The step a may be carried out in a nitrogen atmosphere and a vacuum atmosphere, and specifically, a vacuum atmosphere and a nitrogen atmosphere may be alternately applied in order to remove water remaining in the flask.

In step a, the polyalkylene glycol represented by Structural Formula 2 and the isocyanate-based silane represented by Structural Formula 3 are reacted at a molar ratio of 1:2 to 1:2.5.

In order to allow the isocyanate-based silane to react with two hydroxyl groups (—OH) substituted at ends of the polyalkylene glycol, the isocyanate-based silane compound has to be added in a molar amount at least two times as high as the molar amount of the polyalkylene glycol.

Next, the polyalkylene glycol polymer and a lithium salt are mixed, thus preparing a mixture (step b).

The mixture may include 20 to 90 wt % of the polyalkylene glycol polymer having urethane bonds and 10 to 80 wt % of the lithium salt.

The ionic conductivity of the solid polymer electrolyte may be varied depending on the weight ratio of the polyalkylene glycol polymer having urethane bonds and the lithium salt of the mixture.

Finally, the polyalkylene glycol polymer of the mixture is subjected to a sol-gel reaction, thus preparing a solid polymer electrolyte (step c).

The matrix containing polyalkylene glycol polymer having urethane bonds may be formed through sol-gel reaction, and the structure of the matrix is schematically represented by FIG. 1.

As shown in FIG. 1, the matrix is configured such that polyalkylene glycol polymer having urethane bonds is linked between silsesquioxane.

Unlike the method preparing a solid electrolyte composition by adding a plasticizer, the present invention is characterized in that silsesquioxane is linked to a polyalkylene glycol polymer chain having urethane bonds to form a matrix, thereby improving compatibility.

Also, the present invention pertains to a method of manufacturing a lithium secondary battery including the method of preparing the solid polymer electrolyte as above.

A better understanding of the present invention will be given through the following preferred examples, which are merely set forth to illustrate the present invention but are not to be construed as limiting the scope of the present invention.

EXAMPLES

Example 1: Synthesis of Polyalkylene Glycol Polymer Having Urethane Bonds

The method of preparing a polyalkylene glycol polymer having urethane bonds in Example 1 is represented in Scheme 1 below.

Polyethylene glycol (PEG) (6.00 g, 0.020 mol) and 3-(triethoxysilyl)propyl isocyanate (10.88 g, 0.044 mol) were mixed at a molar ratio of 1:2.2 in a 100 mL round-bottom flask, thus preparing a mixture.

The mixture was heated to 100° C. with stirring, and vacuum and nitrogen were alternately applied about three times using a Schlenk line in order to remove water remaining in the flask.

Thereafter, the temperature was elevated to 130° C. and the stirring rate was fixed to 450 rpm, and the reaction was carried out under a nitrogen stream for 2 hr, thus obtaining a polyalkylene glycol polymer as a viscous liquid.

Figure 3:
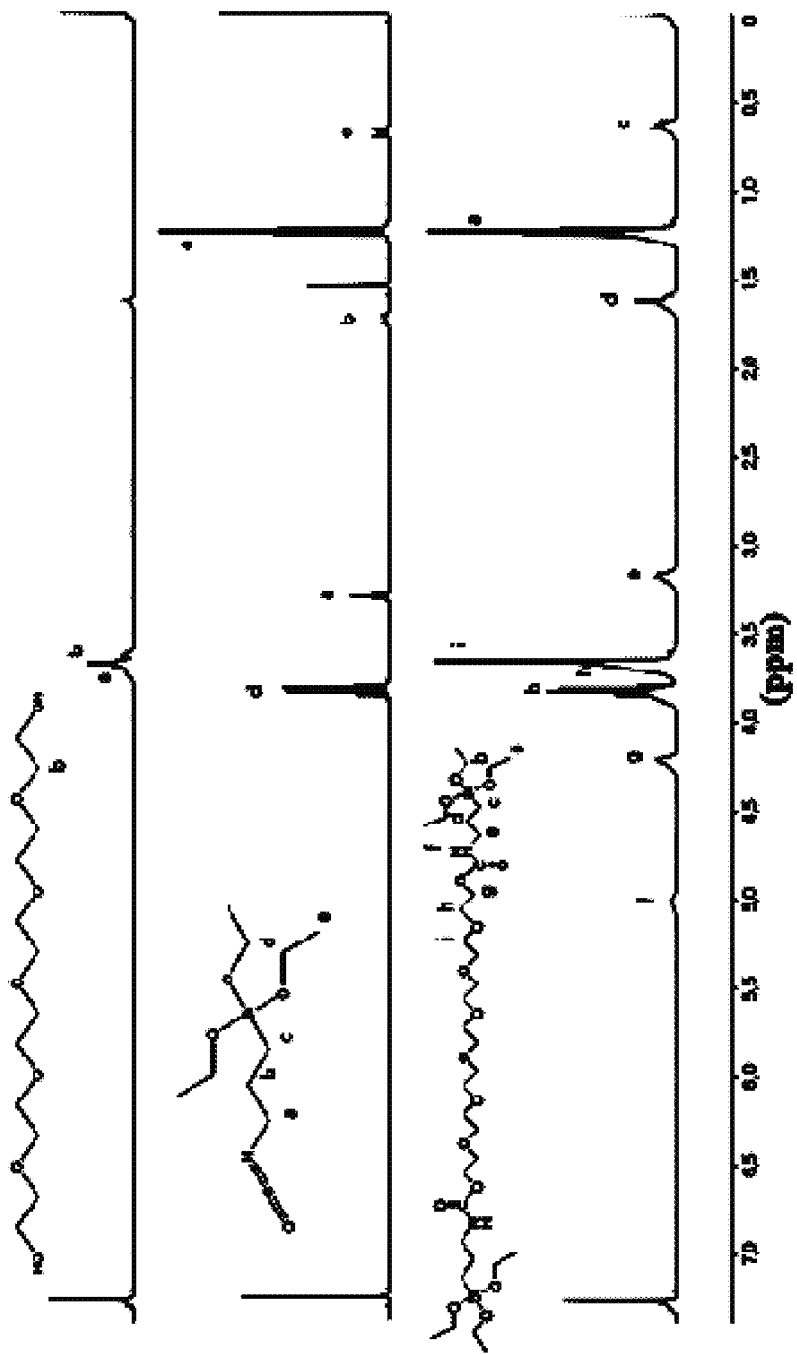
FIG. 3 shows the results of NMR analysis of a polyalkylene glycol polymer prepared in Example 1.

The results of $^1$H NMR analysis of the polyalkylene glycol polymer having urethane bonds of Example 1 are shown in FIG. 3, from which the synthesis of the polyalkylene glycol polymer having urethane bonds was confirmed.

Example 2: Preparation of Solid Polymer Electrolyte 0.9 g of the polyalkylene glycol polymer having urethane bonds of Example 1 was mixed with 1 mL of methanol, thereby preparing a mixed solution. The mixed solution was added with 0.1 g of a lithium salt (bis(trifluoromethane)sulfonimide lithium salt) to give a mixture.

The mixture was added with HCl (0.1 M, 0.5 mL), and was placed in a petri dish before curing, and then heated at 70° C. for 1 hour to a sol-gel reaction, thus preparing a solid polymer electrolyte sol-gel hybrid matrix.

Finally, the petri dish was placed in a vacuum oven (50° C.) for about 24 hr in order to sufficiently remove the solvent, preparing a solid polymer electrolyte.

Example 3: Preparation of Solid Polymer Electrolyte

A solid polymer electrolyte was prepared in the same manner as in Example 2, with the exception that 0.8 g of the polyalkylene glycol and 0.2 g of the lithium salt (bis(trifluoromethane)sulfonimide lithium salt) were added, in lieu of 0.9 g of the polyalkylene glycol and 0.1 g of the lithium salt (bis(trifluoromethane)sulfonimide lithium salt) in Example 2.

Example 4: Preparation of Solid Polymer Electrolyte

A solid polymer electrolyte was prepared in the same manner as in Example 2, with the exception that 0.7 g of the polyalkylene glycol and 0.3 g of the lithium salt (bis(trifluoromethane)sulfonimide lithium salt) were added, in

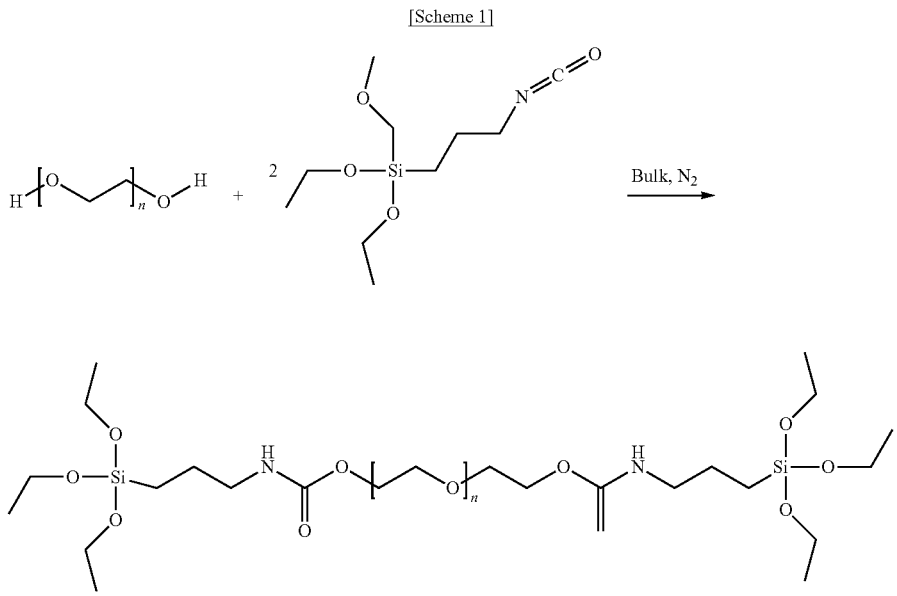

[Scheme 1]

lieu of 0.9 g of the polyalkylene glycol and 0.1 g of the lithium salt (bis(trifluoromethane)sulfonimide lithium salt) in Example 2.

Example 5: Preparation of Solid Polymer Electrolyte

A solid polymer electrolyte was prepared in the same manner as in Example 2, with the exception that 0.5 g of the polyalkylene glycol and 0.5 g of the lithium salt (bis (trifluoromethane)sulfonimide lithium salt) were added, in lieu of 0.9 g of the polyalkylene glycol and 0.1 g of the lithium salt (bis(trifluoromethane)sulfonimide lithium salt) in Example 2.

TEST EXAMPLES

Test Example 1: NMR Analysis

FIG. 3 shows the results of NMR analysis of polyalkylene glycol, 3-(triethoxysilyl)propyl isocyanate, and the polyalkylene glycol polymer having urethane bonds of Example 1, dissolved in $CDCl_3$.

As shown in FIG. 3, amine $CH_2$—NH—C=OO—C was observed at 4.8 ppm, from which the polyalkylene glycol polymer having urethane bonds was confirmed to be synthesized.

Test Example 2: IR Analysis

Figure 4:
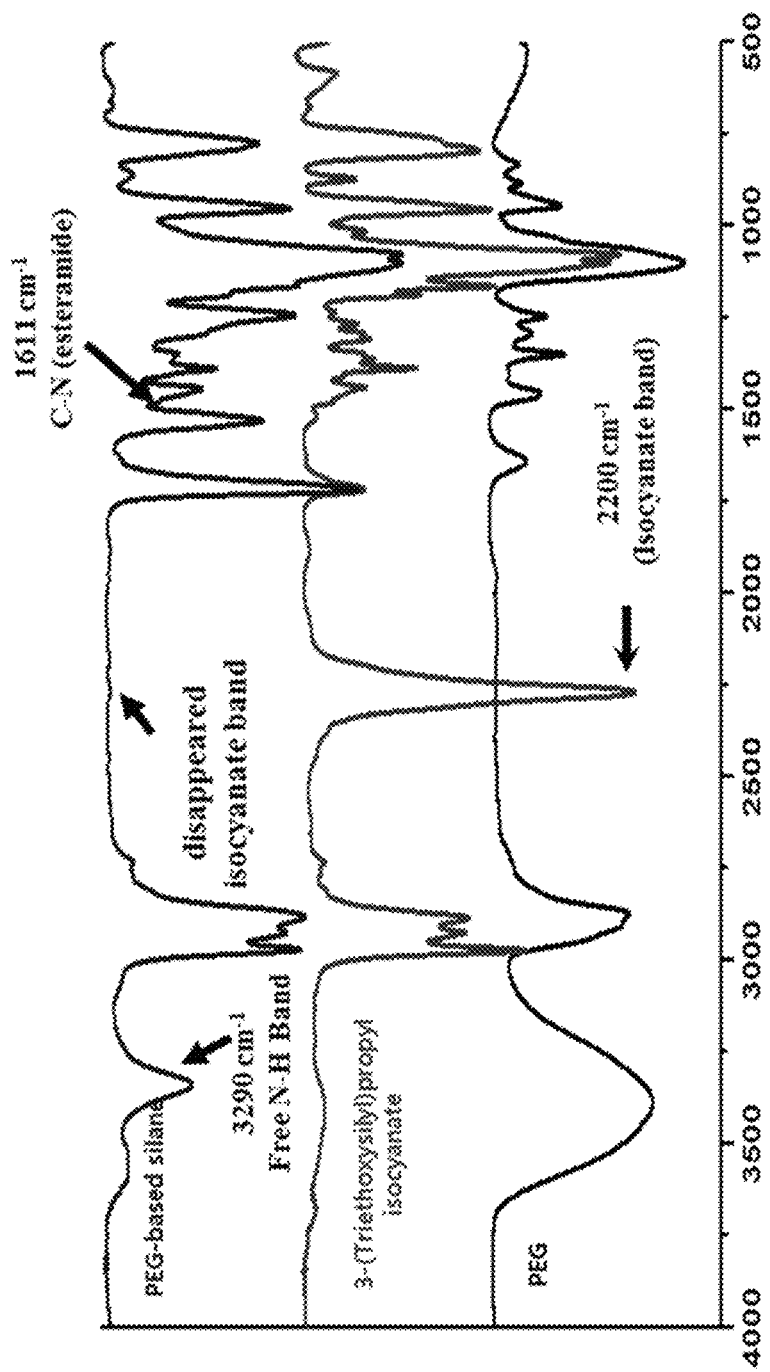
FIG. 4 shows the results of IR spectroscopy analysis of the polyalkylene glycol polymer prepared in Example 1.

FIG. 4 shows the results of IR analysis of polyalkylene glycol, 3-(triethoxysilyl)propyl isocyanate, and the polyalkylene glycol polymer having urethane bonds of Example 1.

As shown in FIG. 4, based on the results of measurement of transmittance in the wavenumber range of 500 to 4000 $cm^{-1}$, the isocyanate peak (2200 $cm^{-1}$) disappeared, and the —NH bond peak was observed at 3290 $cm^{-1}$, and the presence of a C—N bond was observed at 1611 $cm^{-1}$. Thus, the polyalkylene glycol polymer having urethane bond of Example 1 was confirmed to be synthesized.

Test Example 3: Analysis of Ionic Conductivity

The results of analysis of ionic conductivity of the solid electrolytes depending on the amounts of the polyalkylene glycol polymer of Examples 1 and the lithium salt are shown in Table 1 below.

TABLE 1

| No. | Polyalkylene glycol polymer of Example 1 (g) | Lithium salt (LiTFSI) (g) | Ionic conductivity (S/cm) |
|---|---|---|---|
| Example 2 | 0.9 | 0.1 | $7.9 \times 10^{-7}$ |
| Example 3 | 0.8 | 0.2 | $3.4 \times 10^{-7}$ |

TABLE 1-continued

| No. | Polyalkylene glycol polymer of Example 1 (g) | Lithium salt (LiTFSI) (g) | Ionic conductivity (S/cm) |
|---|---|---|---|
| Example 4 | 0.7 | 0.3 | $3.0 \times 10^{-5}$ |
| Example 5 | 0.6 | 0.4 | $1.8 \times 10^{-5}$ |

As is apparent from Table 1, the ionic conductivity of the solid polymer electrolytes of Examples 5 was superior.

Therefore, in order to obtain the solid polymer electrolyte having superior ionic conductivity, it can be found that an appropriate ratio of the polyalkylene glycol polymer and the lithium salt has to be used.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A solid polymer electrolyte, comprising:
   a matrix comprising polyalkylene glycol polymer gel prepared by subjecting a polyalkylene glycol (PAG) polymer having urethane bonds by Structural Formula 1 below to a sol-gel reaction; and
   a lithium salt dispersed in the matrix:

[Structural Formula 1]

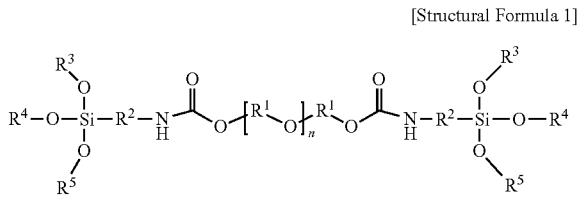

in Structural Formula 1,
$R^1$ is independently a C1 to C20 alkylene group,
$R^2$ is independently a C1 to C20 alkylene group,
$R^3$ to $R^5$ are the same as or different from each other, and are each independently a C1 to C20 alkyl group, and
n is any one integer of 1 to 150,
wherein the lithium salt includes at least one selected from among lithium bis(trifluoromethane)sulfonimide salt, lithium perchlorate, lithium hexafluorophosphate, lithium tetrafluoroborate, and lithium trifluoromethanesulfonate.

2. A lithium secondary battery, comprising the solid polymer electrolyte of claim 1.

* * * * *